United States Patent
Miyamoto et al.

(10) Patent No.: US 9,574,065 B2
(45) Date of Patent: Feb. 21, 2017

(54) THERMOPLASTIC RESIN COMPOSITION AND ITS MOLDED PRODUCT

(71) Applicant: Toray Industries, Inc., Tokyo (JP)

(72) Inventors: Kohei Miyamoto, Nagoya (JP);
Mitsushige Hamaguchi, Nagoya (JP);
Hideyuki Umetsu, Nagoya (JP)

(73) Assignee: Toray Industries, Inc. (JP)

( * ) Notice: Subject to any disclaimer, the term of this patent is extended or adjusted under 35 U.S.C. 154(b) by 358 days.

(21) Appl. No.: 14/236,232

(22) PCT Filed: Nov. 28, 2012

(86) PCT No.: PCT/JP2012/007615
§ 371 (c)(1),
(2) Date: Jan. 30, 2014

(87) PCT Pub. No.: WO2013/099111
PCT Pub. Date: Jul. 4, 2013

(65) Prior Publication Data
US 2014/0170393 A1    Jun. 19, 2014

(30) Foreign Application Priority Data

Dec. 27, 2011    (JP) .................................. 2011-285056

(51) Int. Cl.
*C08K 5/00*    (2006.01)
*B41M 5/26*    (2006.01)
(Continued)

(52) U.S. Cl.
CPC ............ *C08K 5/0091* (2013.01); *B41M 5/267* (2013.01); *C08G 75/00* (2013.01); *C08L 81/00* (2013.01);
(Continued)

(58) Field of Classification Search
CPC .... Y10T 428/24802; B41M 5/24; B41M 5/26; B41M 5/267; B41M 5/28; B41M 5/281
See application file for complete search history.

(56) References Cited

U.S. PATENT DOCUMENTS

| 4,690,969 A | 9/1987 | Takezawa et al. |
| 4,791,153 A | 12/1988 | Yamanaka |

(Continued)

FOREIGN PATENT DOCUMENTS

| EP | 2 343 336 | 7/2011 |
| JP | 62-54757 | 3/1987 |

(Continued)

OTHER PUBLICATIONS

Supplementary European Search Report dated Apr. 20, 2015 of corresponding European Application No. 12862383.2.
(Continued)

*Primary Examiner* — Gerard Higgins
(74) *Attorney, Agent, or Firm* — DLA Piper LLP (US)

(57) ABSTRACT

A thermoplastic resin composition includes 100 parts by weight of a thermoplastic resin (a) that is a liquid crystalline polyester and/or a polyphenylene sulfide; and 0.001 to 10 parts by weight of a metal complex (b) having a monodentate or a bidentate ligand; and at least one metal and/or its salt selected from the group consisting of copper, zinc, nickel, manganese, cobalt, chromium and tin.

11 Claims, 1 Drawing Sheet

(51) Int. Cl.
*C09K 19/38* (2006.01)
*C08G 75/00* (2006.01)
*C08L 81/00* (2006.01)
*C08L 101/00* (2006.01)
*C09K 19/52* (2006.01)

(52) U.S. Cl.
CPC .......... *C08L 101/00* (2013.01); *C09K 19/3809* (2013.01); *C09K 2019/523* (2013.01); *Y10T 428/24802* (2015.01)

(56) References Cited

U.S. PATENT DOCUMENTS

| | | | |
|---|---|---|---|
| 5,053,440 A | 10/1991 | Schueler et al. | |
| 5,489,639 A | 2/1996 | Faber et al. | |
| 6,121,388 A * | 9/2000 | Umetsu | C08K 5/092 525/425 |
| 2002/0016394 A1* | 2/2002 | Hieltjes | B41M 5/267 524/394 |
| 2013/0123452 A1 | 5/2013 | Hage et al. | |

FOREIGN PATENT DOCUMENTS

| | | |
|---|---|---|
| JP | 63-168461 | 7/1988 |
| JP | 3-24161 | 2/1991 |
| JP | 8-187951 | 7/1996 |
| JP | 2000-265042 | 9/2000 |
| JP | 2001-071645 | 3/2001 |
| JP | 2003-327828 | 11/2003 |
| JP | 2003-327828 A | 11/2003 |
| JP | 2005-162913 | 6/2005 |
| JP | 2005-199626 | 7/2005 |
| JP | 2006-225569 | 8/2006 |
| JP | 2006-285195 | 10/2006 |
| JP | 2007-186584 | 7/2007 |
| JP | 2008-045051 | 2/2008 |
| JP | 2008-111010 | 5/2008 |
| JP | 2008-222831 | 9/2008 |
| JP | 2009-40808 | 2/2009 |
| WO | 2005/026247 | 3/2005 |

OTHER PUBLICATIONS

European Communication dated Mar. 30, 2016, of corresponding European Application No. 12862383.2.

* cited by examiner

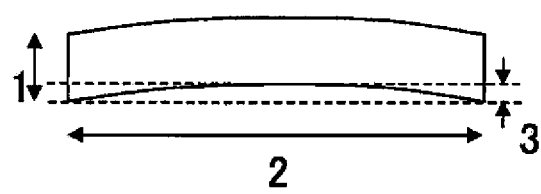

THERMOPLASTIC RESIN COMPOSITION AND ITS MOLDED PRODUCT

The disclosures of Japanese Patent Application 2011-285056A and Patent Application Publication 2012-096360A by Toray Industries, Inc. are hereby incorporated by reference into this application.

TECHNICAL FIELD

This disclosure relates to a thermoplastic resin composition. More specifically, the disclosure relates to a thermoplastic resin composition having excellent laser marking property and excellent heat resistance as well as to its molded product.

BACKGROUND

Liquid crystalline polyesters have excellent heat resistance, excellent flowability and excellent dimensional stability because of their liquid crystalline structure. The demand for liquid crystalline polyester has accordingly been expanded especially in the application of small-size electric and electronic components that require such properties. Polyphenylene sulfide (hereinafter may be abbreviated as PPS), on the other hand, has excellent heat resistance, excellent chemical resistance and excellent electric insulation and is used for various electric and electronic components, machine components and automobile components.

Printing characters, symbols, patterns and a barcode on the surface of a molded product made of a resin composition is widely performed for the purpose of identification of the molded product in, for example, the production process or for the purpose of decoration of the surface of a product. Ink marking, however, has problems such as insufficient adhesion of a coating material and the complicated treatment process. Recently, simple and efficient marking method using laser beam radiation (laser marking) has accordingly received attention. The laser marking technique is a marking method by foaming or carbonizing the resin with laser radiation. This technique eliminates the problems of ink marking regarding, for example, adhesion of a coating material and a complicated treatment process.

The following techniques have been proposed to improve the laser marking property. For example, known techniques include a method of adding a copper salt absorbing laser beam such as copper phosphate or copper sulfate (see, for example, U.S. Pat. No. 5,489,639), a method of adding an alumina hydrate (see, for example, JP 2005-162913A), a method of adding mica and a metal sulfide (see, for example, WO 2005/26247A) and a method of adding a phthalocyanine-based colored colorant (see, for example, JP 2005-199626A). These additions have improved the laser marking property to some extent.

Applying the above techniques to a resin composition including a liquid crystalline polyester and/or a polyphenylene sulfide having high heat resistance, however, causes the following problems. Specifically, the additives added for the purpose of improvement of the laser marking property are degraded, for example, during the molding process under high temperature condition. This accordingly causes the problem that the molded product does not sufficiently absorb laser beam radiation and does not achieve clear marking. Degradation of the additives also causes the problem of a decrease in heat resistance, for example, reduction in viscosity in the high-temperature retention state, blister in the reflow process and an increase in warpage.

It could therefore be helpful to provide a thermoplastic resin composition having high heat resistance and high laser marking property and its molded product by using a liquid crystalline polyester and/or a polyphenylene sulfide having excellent heat resistance.

SUMMARY

We found that the thermoplastic resin composition including a liquid crystalline polyester and/or a polyphenylene sulfide and a specific metal complex has the specifically high leaser marking property and the excellent heat resistance.

We thus provide:

(1) A thermoplastic resin composition, comprising: 100 parts by weight of a thermoplastic resin (a) that is a liquid crystalline polyester and/or a polyphenylene sulfide; and 0.001 to 10 parts by weight of a metal complex (b) having: a monodentate or a bidentate ligand; and at least one metal and/or its salt selected from the group consisting of copper, zinc, nickel, manganese, cobalt, chromium and tin;

(2) The thermoplastic resin composition described in (1), wherein the metal complex (b) contains a ligand shown by Formula [1]:

$$RX \qquad [1]$$

(wherein R represents an aromatic hydrocarbon group or an alicyclic hydrocarbon group, and X represents a heterocyclic group of a five-membered ring or a six-membered ring;

(3) The thermoplastic resin composition described in either (1) or (2), wherein the ligand of the metal complex (b) is 2-mercaptobenzimidazole and/or 2-mercaptobenzothiazole;

(4) The thermoplastic resin composition described in any of (1) to (3), further comprising 10 to 200 parts by weight of a filler (c) relative to a total of 100 parts by weight of the thermoplastic resin (a) and the metal complex (b);

(5) The thermoplastic resin composition described in any of (1) to (4), wherein the thermoplastic resin (a) is a liquid crystalline polyester;

(6) The thermoplastic resin composition described in any of (1) to (5), the thermoplastic resin composition being used for application of laser marking;

(7) A molded product produced by melt molding the thermoplastic resin composition described in any of (1) to (6);

(8) The molded product described in (7), the molded product having marking by radiation of laser beam; and (9) The molded product described in either (7) or (8), the molded product being a relay, a connector, a switch or a thermal protector.

We provide a thermoplastic resin composition having high laser marking property with keeping high heat resistance. Additionally, we provide a molded product having excellent heat resistance and excellent laser marking property by using the thermoplastic resin composition.

BRIEF DESCRIPTION OF THE DRAWINGS

FIG. 1 is a conceptual diagram illustrating a measurement site of warpage according to an example.

DESCRIPTION OF SYMBOLS

1: Press-in Direction of Pin
2: Longitudinal Direction of Connector
3: Warpage

DETAILED DESCRIPTION

"Laser marking property" indicates color development by irradiation of the surface of a molded product with laser beam. The high laser marking property results in the strong color development at the laser-irradiated location and thereby enables the sharply-defined, clear marking or the fine marking. Moreover, the high laser marking property also enables marking with preventing discontinuity and blur of marking even in the case of low-power laser beam or even at the high laser scanning rate.

The thermoplastic resin composition may comprise a thermoplastic resin (a) that is a liquid crystalline polyester and/or a polyphenylene sulfide.

Liquid Crystalline Polyester

The liquid crystalline may be a polyester called thermotropic liquid crystalline polymer showing optical anisotropy in the molten state. The liquid crystalline polyester herein indicates a liquid crystalline polyester having structural units selected from the group including, for example, aromatic oxycarbonyl unit, aromatic and/or aliphatic dioxy units, and aromatic and/or aliphatic dicarbonyl units and forms an anisotropic melt phase.

The aromatic oxycarbonyl unit may be structural unit derived from, for example, p-hydroxybenzoic acid or 6-hydroxy-2-naphthoic acid, and may include two or more of these structural units. The structural unit derived from p-hydroxybenzoic acid is preferable.

The aromatic and/or aliphatic dioxy unit may be structural unit derived from, for example, 4,4'-dihydroxybiphenyl, hydroquinone, 3,3',5,5'-tetramethyl-4,4'-dihydroxybiphenyl, t-butyl hydroquinone, phenyl hydroquinone, 2,6-dihydroxynaphthalene, 2,7-dihydroxynaphthalene, 2,2-bis(4-hydroxyphenyl)propane, 4,4'-dihydroxydiphenyl ether, ethylene glycol, 1,3-propylene glycol or 1,4-butanediol, and may include two or more of these structural units. The structural units derived from 4,4'-dihydroxybiphenyl and hydroquinone are preferable.

The aromatic and/or aliphatic dicarbonyl unit may be structural unit derived from, for example, terephthalic acid, isophthalic acid, 2,6-naphthalenedicarboxylic acid, 4,4'-diphenyldicarboxylic acid, 1,2-bis(phenoxy)ethane-4,4'-dicarboxylic acid, 1,2-bis(2-chlorophenoxy)ethane-4,4'-dicarboxylic acid, 4,4'-diphenyl ether dicarboxylic acid, adipic acid or sebacic acid, and may include two or more of these structural units. The structural units derived from terephthalic acid and isophthalic acid are preferable.

Concrete examples of the liquid crystalline polyester include: (i) liquid crystalline polyester having structural unit derived from p-hydroxybenzoic acid and 6-hydroxy-2-naphthoic acid; (ii) liquid crystalline polyester having structural unit derived from p-hydroxybenzoic acid, structural unit derived from 6-hydroxy-2-naphthoic acid, structural unit derived from an aromatic dihydroxy compound and structural unit derived from an aromatic dicarboxylic acid and/or an aliphatic dicarboxylic acid; (iii) liquid crystalline polyester having structural unit derived from p-hydroxybenzoic acid, structural unit derived from 4,4'-dihydroxybiphenyl and structural unit derived from an aromatic dicarboxylic acid, such as terephthalic acid or isophthalic acid and/or an aliphatic dicarboxylic acid, such as adipic acid or sebacic acid; (iv) liquid crystalline polyester having structural unit derived from p-hydroxybenzoic acid, structural unit derived from 4,4'-dihydroxybiphenyl, structural unit derived from hydroquinone and structural unit derived from an aromatic dicarboxylic acid, such as terephthalic acid or isophthalic acid and/or an aliphatic dicarboxylic acid, such as adipic acid or sebacic acid; (v) liquid crystalline polyester having structural unit derived from p-hydroxybenzoic acid, structural unit derived from ethylene glycol and structural unit derived from terephthalic acid and/or isophthalic acid; (vi) liquid crystalline polyester having structural unit derived from p-hydroxybenzoic acid, structural unit derived from ethylene glycol, structural unit derived from 4,4'-dihydroxybiphenyl and structural unit derived from terephthalic acid and/or an aliphatic dicarboxylic acid, such as adipic acid or sebacic acid; (vii) liquid crystalline polyester having structural unit derived from p-hydroxybenzoic acid, structural unit derived from ethylene glycol, structural unit derived from an aromatic dihydroxy compound and structural unit derived from an aromatic dicarboxylic acid, such as terephthalic acid, isophthalic acid, or 2,6-naphthalenedicarboxylic acid; and (viii) liquid crystalline polyester having structural unit derived from 6-hydroxy-2-naphthoic acid, structural unit derived from 4,4'-dihydroxybiphenyl and structural unit derived from 2,6-naphthalenedicarboxylic acid. Two or more of these examples may be used.

Especially preferable is a liquid crystalline polyester having structural units (I), (II), (III), (IV) and (V) shown below. Using this liquid crystalline polyester preferably provides a thermoplastic resin composition having excellent laser marking property and significantly improved effects of heat resistance such as the thermal stability and warpage in the reflow process. Adjusting the compounding ratio of the following structural units (I), (II), (III), (IV) and (V) enables the melting point of the liquid crystalline polyester to be controlled and further improves the molding properties.

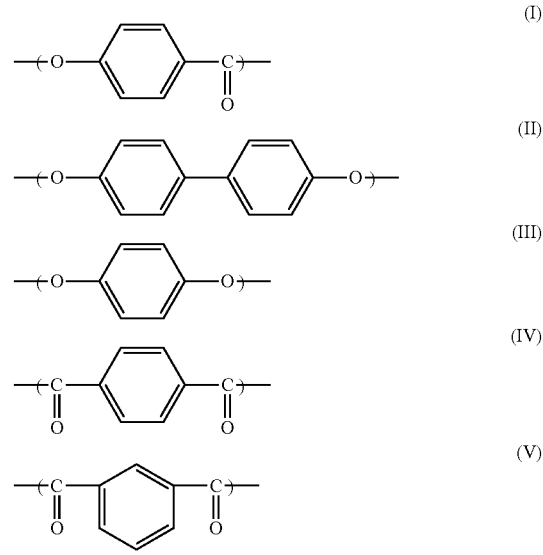

The above structural unit (I) shows structural unit derived from p-hydroxybenzoic acid. The structural unit (II) shows structural unit derived from 4,4'-dihydroxybiphenyl. The structural unit (III) shows structural unit derived from hydroquinone. The structural unit (IV) shows structural unit derived from terephthalic acid. The structural unit (V) shows structural unit derived from isophthalic acid.

The content of the structural unit (I) is preferably not less than 68 mol %, is more preferably not less than 70 mol % and is furthermore preferably not less than 73 mol % relative to the total content of the structural units (I), (II) and (III). The content of the structure unit (I) is, on the other hand, preferably not greater than 80 mol % and is more preferably not greater than 78 mol % relative to the total content of the structural units (I), (II) and (III).

Additionally, the content of the structural unit (II) is preferably not less than 55 mol % and is more preferably not less than 58 mol % relative to the total content of the structural units (II) and (III). The content of the structural unit (II) is, on the other hand, preferably not greater than 75 mol %, is more preferably not greater than 70 mol % and is furthermore preferably not greater than 65 mol % relative to the total content of the structural units (II) and (III).

Moreover, the content of the structural unit (IV) is preferably not less than 60 mol %, is more preferably not less than 65 mol % and is furthermore preferably not less than 70 mol % relative to the total content of the structural units (IV) and (V). The content of the structural unit (IV) is, on the other hand, preferably not greater than 85 mol % relative to the total content of the structural units (IV) and (V).

Furthermore, the total content of the structural units (II) and (III) is preferably substantially equimolar with the total content of the structural units (IV) and (V). The term "substantially equimolar" herein means that the structural units forming the polymer main chain except the terminal groups are equimolar. Even the non-equimolar composition when including the structural units of the terminal groups may accordingly satisfy the "substantially equimolar" condition.

The following describes a method of calculating the contents of the respective structural units. The method weighs the liquid crystalline polyester in an NMR (nuclear magnetic resonance) sample tube and dissolves the weighed liquid crystalline polyester in a liquid crystalline polyester-soluble solvent (for example, pentafluorophenol/tetrachloroethane-$d_2$ mixed solvent). The method subsequently measures the solution by $^1$H-NMR spectroscopy and calculates the contents of the respective structural units from an area ratio of peaks corresponding to the respective structural units.

Controlling the contents of the respective structural units (I) to (V) to the above ranges preferably enables the liquid crystalline polyester having excellent heat resistance, excellent mechanical properties and low gas emission to be easily produced.

In terms of heat resistance, the melting point (Tm) of the liquid crystalline polyester is preferably not lower than 220° C., is more preferably not lower than 270° C. and is furthermore preferably not lower than 300° C. In terms of the molding properties, on the other hand, the melting point (Tm) of the liquid crystalline polyester is preferably not higher than 350° C., is more preferably not higher than 345° C. and is furthermore preferably not higher than 340° C.

The melting point (Tm) is determined by differential scanning calorimetry. A concrete procedure heats the polymer after completion of polymerization under the temperature rise condition of 20° C./minute from room temperature and observes an endothermic peak temperature (Tm1). After observation of the endothermic peak temperature (Tm1), the procedure keeps the polymer at the temperature of the endothermic peak temperature (Tm1)+20° C. for 5 minutes. The procedure then cools down the polymer to room temperature under the temperature decrease condition of 20° C./minute. The procedure subsequently heats the polymer again under the heating condition of 20° C./minute and observes an endothermic peak temperature (Tm2). The melting point (Tm) herein indicates the endothermic peak temperature (Tm2).

In terms of the mechanical strength, the number-average molecular weight of the liquid crystalline polyester is preferably not less than 3,000 and is more preferably not less than 8,000. In terms of the flowability, on the other hand, the number-average molecular weight of the liquid crystalline polyester is preferably not greater than 50,000, is more preferably not greater than 30,000 and is furthermore preferably not greater than 20,000.

The "number-average molecular weight" may be measured by GPC (gel permeation chromatography)/LALLS method. This method uses a liquid crystalline polyester-soluble solvent as an eluent. Available examples of the liquid crystalline polyester-soluble solvent include halogenated phenols and mixed solvents of halogenated phenols and general organic solvents. Preferable are pentafluorophenol and a mixed solvent of pentafluorophenol and chloroform. In terms of the handling properties, especially preferable is a mixed solvent of pentafluorophenol and chloroform.

The GPC measurement is performed, for example, by using a GPC device manufactured by Waters Corporation, a differential refractometer detector RI2410 manufactured by Waters Corporation and columns Shodex K-806M (two columns) and K-802 (one column) manufactured by Showa Denko K.K. Pentafluorophenol/chloroform (35/65 w/w %) is used as the eluent. Available conditions of the GPC measurement are: the measurement temperature of 23° C., the flow rate of 0.8 mL/minute and the sample injection amount of 200 μL (concentration: 0.1%). Additionally, the LALLS measurement is performed, for example, by using a low-angle laser light scattering photometer KMX-6 manufactured by Chromatix, Inc., and available conditions are: the detector wavelength of 633 nm (He—Ne) and the detector temperature of 23° C.

In terms of the mechanical strength, the melt viscosity of the liquid crystalline polyester is preferably not less than 1 Pa·s, is more preferably not less than 10 Pa·s and is furthermore preferably not less than 20 Pa·s. In terms of the flowability, on the other hand, the melt viscosity of the liquid crystalline polyester is preferably not greater than 200 Pa·s, is more preferably not greater than 100 Pa·s and is furthermore preferably not greater than 50 Pa·s.

This melt viscosity is given as a value measured by Koka-type flow tester under the conditions of the temperature equal to the melting point (Tm) of the liquid crystalline polyester+10° C. and the shear rate of 1000/second.

The production method of the liquid crystalline polyester is not specifically limited, but may be in conformity with a known polyester polycondensation method. For example, the following production methods may be employed as the known polyester polycondensation method:

(1) method of producing a liquid crystalline polyester by deacetylation polycondensation reaction from p-acetoxybenzoic acid, 4,4'-diacetoxybiphenyl, diacetoxybenzene, terephthalic acid and isophthalic acid;

(2) method of producing a liquid crystalline polyester by acetylation of phenolic hydroxyl groups though reactions of p-hydroxybenzoic acid, 4,4'-dihydroxybiphenyl, hydroquinone, terephthalic acid and isophthalic acid with acetic anhydride and subsequent deacetylation polycondensation reaction;

(3) method of producing a liquid crystalline polyester by dephenolation polycondensation reaction from phenyl p-hydroxybenzoate, 4,4'-dihydroxybiphenyl, hydroquinone, diphenyl terephthalate and diphenyl isophthalate; and (4) method of producing a liquid crystalline polyester by phenyl esterification through reactions of p-hydroxybenzoic acid and an aromatic dicarboxylic acid, such as terephthalic acid or isophthalic acid, with specified amounts of diphenyl carbonate and subsequent dephenolation polycondensation reaction with addition of an aromatic dihydroxy compound, such as 4,4'-dihydroxybiphenyl or hydroquinone.

Among them, the method (2) of producing a liquid crystalline polyester by acetylation of phenolic hydroxyl groups though reactions of p-hydroxybenzoic acid, 4,4'-dihydroxybiphenyl, hydroquinone, terephthalic acid and isophthalic acid with acetic anhydride and subsequent deacetylation polycondensation reaction is preferably employed, since this is industrially advantageous in terms of the control of the terminal group structure of the liquid crystalline polyester and the control of the degree of polymerization.

In the above production method, in terms of the quick progress of the polymerization reaction, the amount of acetic anhydride used is preferably not less than 1.00 molar equivalent, is more preferably not less than 1.03 molar equivalent and is furthermore preferably not less than 1.05 molar equivalent to the total of the phenolic hydroxyl groups of p-hydroxybenzoic acid, 4,4'-dihydroxybiphenyl and hydroquinone. In terms of the control of the terminal group structure of the liquid crystalline polyester, on the other hand, the amount of acetic anhydride used is preferably not greater than 1.15 molar equivalent and is more preferably not greater than 1.12 molar equivalent to the total of the phenolic hydroxyl groups of p-hydroxybenzoic acid, 4,4'-dihydroxybiphenyl and hydroquinone. Moreover, adjusting the amount of acetic anhydride used to the above range can control the rate of acetylation of hydroquinone having the low acetylation reaction rate and thereby easily control the terminal group structure of the liquid crystalline polyester. This enables production of a liquid crystalline polyester composition having lower gas emission.

The following method is preferably employed as the method of producing the liquid crystalline polyester by deacetylation polycondensation reaction. Specifically this method is melt polymerization method that completes the polycondensation reaction under reduced pressure in the state of temperature at which the liquid crystalline polyester melts. The melt polymerization method is advantageous to production of a homogeneous polymer and preferably produces a polymer having lower gas emission.

More specifically, the following method is employed as the method of producing the liquid crystalline polyester by the deacetylation polycondensation reaction. The method loads specified amounts of p-hydroxybenzoic acid, 4,4'-dihydroxybiphenyl, hydroquinone, terephthalic acid, isophthalic acid and acetic anhydride in a reaction vessel and heats these raw materials with stirring under nitrogen gas atmosphere, in order to acetylate the hydroxyl groups. The reaction vessel used herein is equipped with stirring blades, a distillation pipe and an outlet provided in its lower portion. The method subsequently increases the temperature of the mixture to the melt temperature of the liquid crystalline polyester and then reduces the pressure for polycondensation to complete the reaction.

In terms of accelerating the progress of the reaction, the temperature of acetylation is preferably not lower than 130° C. and is more preferably not lower than 135° C. In terms of preventing the excessive progress of the reaction, on the other hand, the temperature of acetylation is preferably not higher than 300° C. and is more preferably not higher than 200° C. In terms of increasing the rate of reaction, the time of acetylation reaction is preferably not shorter than 1 hour. In terms of the productivity, on the other hand, the time of acetylation reaction is preferably not longer than 6 hours and is more preferably not longer than 4 hours.

The temperature of polycondensation is in the range of the melt temperature of the liquid crystalline polyester, for example, 250 to 365° C. and is preferably the temperature that is not lower than the (melting point of the liquid crystalline polyester+10° C.). In terms of the productivity, the pressure of polycondensation is preferably not less than 0.1 mmHg (13.3 Pa). In terms of acceleration of the polycondensation reaction, on the other hand, the pressure of polycondensation is preferably not greater than 20 mmHg (2660 Pa), is more preferably not greater than 10 mmHg (1330 Pa) and is furthermore preferably not greater than 5 mmHg (665 Pa). The acetylation and the polycondensation herein may be performed continuously in one identical reaction vessel or may be performed in different reaction vessels.

The following method may be employed as the method of taking out the obtained polymer from the reaction vessel after completion of polymerization. This method pressurizes the inside of the reaction vessel at the temperature at which the polymer is melt, discharges the polymer from an outlet provided in the reaction vessel and cools down the discharged polymer in cooling water. The inside of this reaction vessel may be pressurized to, for example, 0.02 to 0.5 MPa. This outlet may be located in the lower portion of the reaction vessel. Additionally, the polymer may be discharged in strands from the outlet. Resin pellets can be obtained by cutting the polymer cooled down in the cooling liquid into pellets.

A solid phase polymerization method may be adopted to complete the polycondensation reaction, as the method of producing the liquid crystalline polyester according to the embodiment of the invention. For example, the following method may be employed as the process by the solid phase polymerization method. The method may crush a polymer or oligomer of the liquid crystalline polyester with a crusher. The method heats the crushed polymer or oligomer under nitrogen stream or under reduced pressure to allow polycondensation to a desired degree of polymerization and thereby complete the reaction. This heating may be in the range of the (melting point of the liquid crystalline polyester−5° C.) to the (melting point of the liquid crystalline polyester−50° C.) (for example, 200 to 300° C.) for 1 to 50 hours.

The polycondensation reaction of the liquid crystalline polyester can proceed without a catalyst. A metal compound, such as tin (II) acetate, tetrabutyl titanate, potassium acetate, sodium acetate, antimony trioxide, or metal magnesium may, however, be used as the catalyst.

Polyphenylene Sulfide

The polyphenylene sulfide may be a polymer having a repeating unit shown by a structural formula given below. In terms of the heat resistance, the polyphenylene sulfide includes preferably not less than 70 mol % and more preferably includes not less than 90 mol % of the repeating unit shown by the following structural formula:

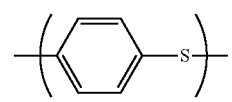

Additionally, about 30 mol % or less of the repeating unit of the polyphenylene sulfide may be structured as repeating units shown by structural formulae given below. Partial inclusion of such repeating units decreases the melting point of the polyphenylene sulfide and is thus advantageous to the moldability.

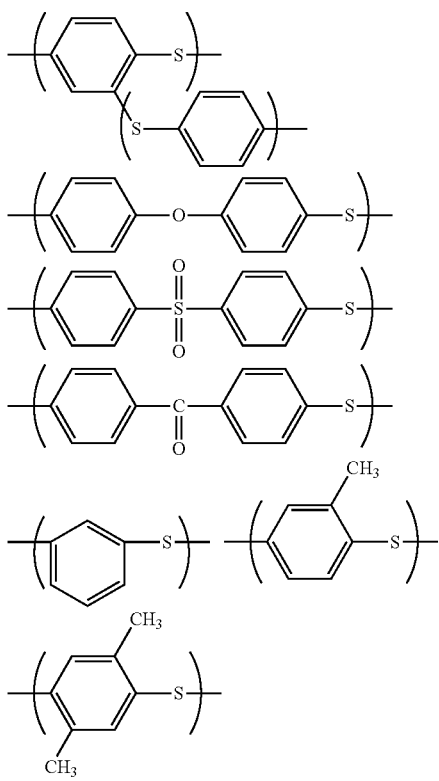

The melt viscosity of the polyphenylene sulfide is not specifically limited, but in terms of easily obtaining a thin-wall injection molded product of the high flowability, is preferably not greater than 200 Pa·s, is more preferably not greater than 150 Pa·s and is furthermore preferably not greater than 100 Pa·s. In terms of the workability of melt molding and the gas emission, the lower limit is preferably not less than 1 Pa·s.

The "melt viscosity" of the polyphenylene sulfide herein is a value measured under the conditions of 300° C. and the shear rate of 1000/second with Capilograph manufactured by Toyo Seiki Seisaku-sho, Ltd.

The method of producing the polyphenylene sulfide is not specifically limited, but may be in conformity with a known polymerization method of polyphenylene sulfide. The known polymerization method of polyphenylene sulfide may be, for example, a method of making a sulfidizing agent react with a polyhalogenated aromatic compound in a polymerization solvent as shown in JP 2012-096360A. A molecular weight modifier, a polymerization modifier and a polymerization stabilizer may additionally be used as needed basis.

The "polyhalogenated aromatic compound" is a compound having two or more halogen atoms in one molecule. Specific examples of the polyhalogenated aromatic compound include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5,-dichloro-p-xylene, 1,4-dibromobenzene, 1,4-diiodobenzene and 1-methoxy-2,5-dichlorobenzene, and p-dichlorobenzene is used preferably. Additionally, two or more polyhalogenated aromatic compounds may be used in combination. In the case of combining the two or more polyhalogenated aromatic compounds, it is preferable to use p-dihalogenated aromatic compound as the major component. To obtain the polyphenylene sulfide having the viscosity suitable for processing, the amount of the polyhalogenated aromatic compound used is preferably 1.005 to 1.2 mol per 1 mol of the sulfidizing agent.

The "sulfidizing agent" may be, for example, an alkali metal sulfide, an alkali metal hydrosulfide or hydrogen sulfide.

Specific examples of the alkali metal sulfide include lithium sulfide, sodium sulfide, potassium sulfide, rubidium sulfide and cesium sulfide. Among them, sodium sulfide is preferably used. Any of these alkali metal sulfides may be used in the form of a hydrate, an aqueous mixture or an anhydride.

Specific examples of the alkali metal hydrosulfide include sodium hydrosulfide, potassium hydrosulfide, lithium hydrosulfide, rubidium hydrosulfide and cesium hydrosulfide. Among them, sodium hydrosulfide is preferably used. Any of these alkali metal hydrosulfides may be used in the form of a hydrate, an aqueous mixture or an anhydride.

Additionally, an alkali metal sulfide prepared from an alkali metal hydrosulfide and an alkali metal hydroxide or an alkali metal sulfide prepared from an alkali metal hydroxide and hydrogen sulfide may also be used.

Furthermore, the sulfidizing agent may be used in combination with an alkali metal hydroxide and/or an alkaline earth metal hydroxide. When an alkali metal hydrosulfide is used as the sulfidizing agent, it is preferable to use an alkali metal hydroxide together. In this case, the amount of the alkali metal hydroxide used is preferably 1.005 to 1.100 mol per 1 mol of the alkali metal hydrosulfide.

As the polymerization solvent, an organic polar solvent is used preferably, and N-methyl-2-pyrrolidone (hereinafter may be abbreviated as NMP) is used especially preferably. The amount of the polymerization solvent used is preferably 2.5 to 5.5 mol per 1 mol of the sulfidizing agent.

A monohalogenated compound may be used in combination with the above polyhalogenated aromatic compound to form a desired terminal group in the produced polyphenylene sulfide or to control the polymerization reaction or the molecular weight. Monohalogenated benzene is preferably used as the monohalogenated compound.

It is also preferable to use a polymerization modifier to obtain the polyphenylene sulfide of the relatively high degree of polymerization in a shorter time. The "polymerization modifier" herein means a substance having the function of increasing the viscosity of the resulting polyphenylene sulfide. An organic carboxylate, water or an alkali metal chloride is preferably used as the polymerization modifier. As the organic carboxylate, an alkali metal carboxylate is preferable and sodium acetate is more preferable. As the alkali metal chloride, lithium chloride is preferable.

The amount of the alkali metal carboxylate used as the polymerization modifier is preferably 0.2 to 0.5 mol per 1 mol of the sulfidizing agent. The amount of water used as the polymerization modifier is more preferably 1 to 5 mol per 1 mol of the fed sulfidizing agent. The amount of the "fed" sulfidizing agent herein means a remaining amount determined by subtracting an amount of loss as a compound such as hydrogen sulfide from an actual fed amount of the sulfidizing agent, when there is a partial loss of the sulfidizing agent as the compound such as hydrogen sulfide due to, for example, a dehydration operation, prior to a start of the polymerization reaction.

The polymerization modifier may be added at any time during a prior process, at the start of polymerization or in the middle of the polymerization reaction described later and may be added in a plurality of additions. When an alkali metal carboxylate is used as the polymerization modifier, in terms of the easiness of addition, it is more preferable to add the polymerization modifier simultaneously with the other materials at the start of the prior process or at the start of polymerization. When water is used as the polymerization modifier, on the other hand, it is effective to add the polymerization modifier in the middle of the polymerization reaction after the supply of the polyhalogenated aromatic compound.

A polymerization stabilizer may be used to stabilize the polymerization reaction system and prevent side reaction. The side reaction may be a thiophenol generating reaction. Addition of the polymerization stabilizer interferes with the thiophenol generating reaction. An alkali metal hydroxide such as sodium hydroxide, potassium hydroxide or lithium hydroxide is preferably used as the polymerization stabilizer. It is preferable to use the polymerization stabilizer at the ratio of 0.04 to 0.09 mol to 1 mol of the fed sulfidizing agent. The polymerization stabilizer may be added at any time during the prior process, at the start of polymerization or in the middle of the polymerization reaction described later and may be added in a plurality of additions. In terms of the easiness of addition, it is more preferable to add the polymerization stabilizer simultaneously with the other materials at the start of the prior process or at the start of polymerization.

The following specifically and sequentially describes a prior process, a polymerization reaction process, a recovery process and a post treatment process with respect to the preferable production method of polyphenylene sulfide according to an embodiment of the invention. Examples of our compositions are, however, not limited to this method.

Prior Process

The sulfidizing agent is generally used in the form of a hydrate. It is accordingly preferable to raise the temperature of a mixture including a polymerization solvent and a sulfidizing agent and thereby remove an excess amount of water out of the system, prior to addition of a polyhalogenated aromatic compound.

Polymerization Reaction Process

The polyphenylene sulfide is produced by reaction of the polyhalogenated aromatic compound with the sulfidizing agent in the polymerization solvent in a temperature range of not lower than 200° C. but lower than 290° C.

The polymerization reaction process may start by mixing an organic polar solvent as the polymerization solvent and the sulfidizing agent with the polyhalogenated aromatic compound preferably under an inert gas atmosphere in a temperature range of ordinary temperature to 240° C. or preferably in a temperature range of 100 to 230° C. At this stage, the polymerization modifier may be added. The feeding order of these raw materials is not specifically limited, and these raw materials may be fed simultaneously. The temperature of this mixture is generally raised to the range of 200° C. to 290° C. The rate of temperature rise is not specifically limited but is preferably 0.1 to 3° C./minute. The general process finally raises the temperature of the mixture to the temperature of 250 to 290° C. and keeps the mixture at the temperature preferably for 0.5 to 20 hours. A method of raising the temperature to 270 to 290° C. after the reaction proceeding for a predetermined time at, for example, 200 to 260° C. at the stage prior to reaching to the final temperature is effective to achieve the higher degree of polymerization. The time of the above reaction at 200 to 260° C. is preferably 0.25 to 10 hours.

Recovery Process

After completion of the polymerization reaction, a solid substance is recovered from a polymerization reactant including a polymer and the solvent. Any known method may be employed as the recovery method. For example, after completion of the polymerization reaction, an available method may slowly cool down the polymerization reactant to allow recovery of a particulate polymer. A flash method is also one preferable method of recovery. The "flash method" flashes the polymerization reactant from the state of high temperature and high pressure (generally not lower than 250° C. and not less than 8 kg/cm$^2$) into an atmosphere of ordinary pressure or reduced pressure and thereby recovers the polymer in the powdery form simultaneously with recovery of the solvent. "Flashing" herein means ejecting the polymerization reactant from a nozzle. The atmosphere into which the polymerization reactant is flashed is, for example, nitrogen or steam in ordinary pressure, and 150° C. to 250° C. is generally selected as the flashing temperature.

Post Treatment Process

The polyphenylene sulfide produced through the prior process, the polymerization reaction process and the recovery process described above may be subjected to acid treatment, hot water treatment, washing with an organic solvent or treatment with an alkali metal or an alkaline earth metal.

In the case of acid treatment, acetic acid and hydrochloric acid are preferably used as the acid. An available method of the acid treatment soaks the polyphenylene sulfide in an acid or an acid aqueous solution, and the acid treatment may be performed with adequately stirring or heating as needed basis. For the purpose of removal of the remaining acid or salt, it is preferable to wash the polyphenylene sulfide subjected to the acid treatment, with water or warm water several times.

In the case of hot water treatment, the temperature of hot water is preferably not lower than 170° C. To achieve the desired effect of chemical modification of the polyphenylene sulfide by the hot water washing, the water used is preferably distilled water or deionized water. The operation of the hot water treatment is not specifically limited. An available method of hot water treatment heats and stirs a predetermined amount of the polyphenylene sulfide added to a predetermined amount of water in a pressure vessel. Another available method continuously performs the hot water treatment. For the purpose of removal of the remaining component, it is preferable to wash the polyphenylene sulfide subjected to the hot water treatment, with warm water several times.

In the case of washing with an organic solvent, for example, N-methyl-2-pyrrolidone, acetone, dimethylformamide or chloroform may be used as the organic solvent. An available method of washing with the organic solvent soaks the polyphenylene sulfide in the organic solvent, and the organic solvent washing may be performed with adequately stirring or heating as needed basis.

An available method of treatment with an alkali metal or an alkaline earth metal may add an alkali metal salt or an alkaline earth metal salt after removal of the remaining oligomer or the remaining salt, for example, by the organic solvent washing or by warm water or hot water washing. It is preferable to add the alkali metal or the alkaline earth metal in the form of an alkali metal ion or an alkaline earth metal ion such as an acetate, a hydroxide or a carbonate to the PPS. It is also preferable to remove an excess of the alkali metal salt or the alkaline earth metal salt by, for example, warm water washing.

The polyphenylene sulfide may be used after high polymerization by a cross-linking process using a cross-linking agent. In terms of improvement of the mechanical properties such as impact strength, however, it is preferable to use the polyphenylene sulfide without high polymerization by the cross-linking process, and substantially linear PPS is preferable. A plurality of polyphenylene sulfides having different melt viscosities may also be used.

The liquid crystalline polyester and the polyphenylene sulfide may be used separately or may be used in combination.

In the case of the combined use of the liquid crystalline polyester and the polyphenylene sulfide, their mixing ratios are preferably 20 to 80% by weight of the liquid crystalline polyester and 80 to 20% by weight of the polyphenylene sulfide relative to the total of 100% by weight. The mixing ratios in the above ranges preferably improve the dispersibility of the liquid crystalline polyester and the polyphenylene sulfide in the thermoplastic resin composition and ensure the more remarkable advantageous effects of the invention.

In terms of the laser marking property and the heat resistance, the thermoplastic resin composition preferably contains the liquid crystalline polyester.

The thermoplastic resin composition may contain a metal complex (b) having a monodentate or a bidentate ligand and at least one metal or its salt selected from the group consisting of copper, zinc, nickel, manganese, cobalt, chromium and tin, in addition to the thermoplastic resin (a) that is the liquid crystalline polyester and/or the polyphenylene sulfide.

Metal Complex

The metal complex (b) may be a complex formed by monodentate or bidentate coordination of the ligand with the above metal or its salt. The monodentate or bidentate ligand reduces the warpage in the reflow process and improves the heat resistance. The tridentate or more polydentate ligand, on the other hand, increases the warpage in the reflow process and reduces the heat resistance.

Additionally, the metal complex (b) may include at least one metal or its salt selected from the group consisting of copper, zinc, nickel, manganese, cobalt, chromium and tin. Using any of these metals facilitates absorption of laser beam for marking and thereby enables sharp marking. Using no metal or using a metal species other than the above, on the other hand, causes insufficient absorption of laser beam and does not achieve the sufficient laser marking property. The metal salt may be in the form of a halide, an oxide, a sulfide or a nitride, and a halide is preferable.

The metal complex (b) preferably contains a ligand shown by Formula [1]:

$$RX \qquad [1]$$

In Formula [1], R represents an aromatic hydrocarbon group or an alicyclic hydrocarbon group, and X represents a heterocyclic group of a five-membered ring or a six-membered ring. Additionally, in Formula [1], RX may have a bonding between carbon atoms, nitrogen atoms and sulfur atoms and may form a condensed ring.

With respect to R in Formula [1], the number of carbon atoms in the aromatic hydrocarbon group is preferably 6 to 14. Examples of the aromatic hydrocarbon group of 6 to 14 carbon atoms include benzene, naphthalene and anthracene, and benzene is especially preferable in terms of the laser marking property. Examples of the alicyclic hydrocarbon group include cycloalkanes, polycycloalkanes and their unsaturated compounds. The number of carbon atoms in the alicyclic hydrocarbon group is preferably 5 to 14. In terms of the laser marking property, among the alicyclic hydrocarbon groups of 5 to 14 carbon atoms, cyclohexane is especially preferable.

In terms of the laser marking property and the heat resistance, R in Formula [1] is preferably an aromatic hydrocarbon group and is especially preferably benzene.

With respect to X in Formula [1], examples of the heterocyclic group of the five-membered ring or the six-membered ring include furan, pyrrole, pyridine, imidazole, oxazole, thiazole and pyrazole. To further improve the laser marking property, imidazole, oxazole and thiazole are especially preferable. Additionally, any of these heterocyclic groups preferably has a substituent. Preferable examples of the substituent include halogen atom, alkyl group, carboxyl group, sulfonyl group, cyano group, nitro group, hydroxyl group, thiol group and amino group. In terms of the reactivity, thiol group is especially preferable as the substituent.

With respect to the metal complex (b), in terms of the laser marking property, the heat resistance and complexation, the ligand is preferably 2-mercaptobenzimidazole and/or 2-mercaptobenzothiazole.

The thermoplastic resin composition may contain two or more metal complexes (b) described above.

The content of the metal complex (b) may be 0.001 to 10 parts by weight relative to 100 parts by weight of the thermoplastic resin (a) that is the liquid crystalline polyester and/or the polyphenylene sulfide. When the thermoplastic resin composition contains one of the liquid crystalline polyester and the polyphenylene sulfide, the content of the contained resin is 100 parts by weight. When the thermoplastic resin composition contains both of the liquid crystalline polyester and the polyphenylene sulfide, the total content of both the resins is 100 parts by weight.

The content of the metal complex (b) that is less than 0.001 parts by weight does not have the sufficient effect of improving the laser marking property. In terms of further improving the laser marking property, the content of the metal complex (b) is preferably not less than 0.01 parts by weight. The content of the metal complex (b) that is greater than 10 parts by weight, on the other hand, reduces the heat resistance of the thermoplastic resin composition by thermal degradation of the metal complex (b). In terms of further improving the heat resistance, the content of the metal complex (b) is preferably not greater than 1 part by weight and is more preferably not greater than 0.5 parts by weight.

In the case that the metal complex (b) is mixed with the thermoplastic resin (a), it is expected that the metal complex (b) efficiently absorbs the radiated laser beam and causes aggregation or a structural change. This forms a clear marking on the surface of the thermoplastic resin composition irradiated with the laser beam.

The metal complex (b) may be produced by a known synthesis method or may be obtained by purchasing a commercially available metal complex. For example, NOCCELER MZ (2-fold molar complex of 2-mercaptobenzothiazole and zinc) manufactured by OUCHI SHINKO CHEMICAL INDUSTRIAL CO., LTD. or copper (II) acetylacetonate complex manufactured by KANTO CHEMICAL CO., INC. may be used as the metal complex (b).

In terms of improving the mechanical strength and improving the heat resistance and especially in terms of reducing the warpage in the reflow process, it is preferable that the thermoplastic resin composition further contains a filler (c).

Filler

For example, a fibrous filler, a plate-like filler, a powdery filler or a granular filler may be used as the filler (c). Concrete examples of the filler (c) include: glass fibers; polyacrylonitrile (PAN) series and pitch series of carbon fibers; metal fibers such as stainless steel fibers, aluminum fibers and brass fibers; organic fibers such as aromatic polyamide fibers; fibrous and whisker fillers such as gypsum fibers, ceramic fibers, asbestos fibers, zirconia fibers, alumina fibers, silica fibers, titanium oxide fibers, silicon carbide fibers, rock wool, potassium titanate whiskers, barium titanate whiskers, aluminum borate whiskers, silicon nitride whiskers and needle-like titanium oxide; and powdery, granular and plate-like fillers such as mica, talc, kaolin, silica, glass beads, glass flakes, clay, molybdenum disulfide, wollastonite, titanium oxide, zinc oxide, calcium polyphosphate and graphite. Any of the above fillers may have the surface treated with a known coupling agent (for example, silane coupling agent or titanate coupling agent) or another surface treatment agent. Additionally, two or more of the above fillers may be used in combination.

Among these fillers, glass fibers are especially preferable. The type of glass fibers is not specifically limited but may be any glass fibers generally used for reinforcement of the resin. The glass fibers used may be selected among long fiber types and short fiber types including chopped strands and milled fibers. The glass fibers used according to the embodiment of the invention are preferably weak alkaline in terms of the mechanical strength. More specifically, glass fibers having the content of silicon oxide of 50 to 80% by weight are preferably used, and glass fibers having the content of silicon oxide of 65 to 77% by weight are more preferable. Additionally, the glass fibers are preferably treated with a coating agent or sizing agent such as epoxy-based, urethane-based or acrylic-based, and specifically preferable is treatment with the epoxy-based agent. Moreover, the glass fibers are preferably treated with a coupling agent such as silane-based or titanate-based or with another surface treatment agent, and specifically preferable is treatment with an epoxy silane or amino silane-based coupling agent. The glass fibers herein may be coated or sized with a thermoplastic resin such as ethylene/vinyl acetate copolymer or a thermosetting resin such as epoxy resin.

The content of the filler (c) is preferably 10 to 200 parts by weight relative to the total of 100 parts by weight of the thermoplastic resin (a) that is the liquid crystalline polyester and/or the polyphenylene sulfide and the metal complex (b). The content of the filler (c) set to be not less than 10 parts by weight further improves the heat resistance and the mechanical strength. The content of the filler (c) is more preferably not less than 20 parts by weight and is furthermore preferably not less than 30 parts by weight. The content of the filler (c) set to be not greater than 200 parts by weight, on the other hand, improves the flowability. The content of the filler (c) is more preferably not greater than 150 parts by weight and is furthermore preferably not greater than 100 parts by weight.

The thermoplastic resin composition may additionally contain a conventional additive in a range that does not interfere with the advantageous effects for example, antioxidants, heat stabilizers (e.g., hindered phenol, hydroquinone, phosphites and their substitution products), ultraviolet absorbers (e.g., resorcinol and salicylate), coloring inhibitors such as phosphites and hypophosphites, lubricants and mold release agents (e.g., montanic acid and its metal salts, its esters and its half esters, stearyl alcohol, stearamide and polyethylene wax), coloring agents including dyes and pigments, carbon black working as a conductive agent or a coloring agent, crystal nucleating agents, plasticizers, flame retardants (e.g., bromine flame retardants, phosphorous flame retardants, red phosphorus and silicone flame retardants), flame retardant auxiliaries and antistatic agents. The thermoplastic resin composition may also contain a polymer other than the liquid crystalline polyester and/or the polyphenylene sulfide to additionally have specified properties.

In the case that the thermoplastic resin composition contains both of the liquid crystalline polyester and the polyphenylene sulfide, the thermoplastic resin composition may additionally contain a compatibilizer to improve the compatibility between the liquid crystalline polyester and the polyphenylene sulfide. An organosilane compound, such as an alkoxysilane, having at least one functional group selected from the group consisting of epoxy group, amino group, isocyanate group, hydroxy group, mercapto group and ureido group or a polyfunctional epoxy compound may be used as the compatibilizer. The compatibilizer may contain two or more of these compounds. The "polyfunctional epoxy compound" herein indicates a compound including two or more epoxy groups in one molecule. The polyfunctional epoxy compound used may be in a liquid state or in a solid state. Examples of the polyfunctional epoxy compound include: copolymers of α-olefins such as ethylene, propylene and 1-butene and α,β-unsaturated glycidyl esters such as glycidyl acrylate, glycidyl methacrylate and glycidyl ethacrylate; epoxy group-containing high molecular compounds obtained by epoxidation of double bonding of polymers having unsaturated double bonds; bisphenol-glycidyl ether epoxy compounds such as bisphenol A, resorcinol, hydroquinone, pyrocatechol, bisphenol F, saligenin, 1,3,5-trihydroxybenzene, bisphenol S, trihydroxydiphenyl dimethyl methane, 4,4'-dihydroxybiphenyl, 1,5-dihydroxynaphthalene, Cashew phenol, 2,2,5,5-tetrakis(4-hydroxyphenyl)hexane; glycidyl ester epoxy compounds such as phthalic acid glycidyl ester; glycidyl amine epoxy compounds such as N-glycidyl aniline; and novolac epoxy resins obtained by reaction of epichlorohydrin with novolac phenolic resins. Among these compatibilizers, the copolymers of α-olefins and α, β-unsaturated glycidyl esters, the glycidyl ester epoxy resins, the organosilane compounds having epoxy group or isocyanate group and the bisphenol-glycidyl ether epoxy compounds are preferably used. Using the glycidyl ester epoxy resin as the compatibilizer is especially preferable to achieve the excellent compatibility between the liquid crystalline polyester and the polyphenylene sulfide.

The content of the compatibilizer is preferably 0.01 to 10 parts by weight relative to 100 parts by weight of the thermoplastic resin (a) that is the liquid crystalline polyester and the polyphenylene sulfide.

The thermoplastic resin composition may additionally contain a marking assistant such as an inorganic metal compound other than the metal complex (b) or an organic compound.

The production method of the thermoplastic resin composition is not specifically limited. Available production methods include a method of dry blending the thermoplastic resin (a) that is the liquid crystalline polyester and/or the polyphenylene sulfide and the metal complex (b) and optionally other additives; a method of mixing in the form of a solution; a method of adding the metal complex (b) and optionally other additives during polymerization of the thermoplastic resin (a) that is the liquid crystalline polyester and/or the polyphenylene sulfide; and a method of melt kneading the thermoplastic resin (a) that is the liquid crystalline polyester and/or the polyphenylene sulfide and the metal complex (b) and optionally other additives. Among these production methods, the method of melt kneading is preferable. Any known machine such as a Banbury mixer, a rubber roller, a kneader, a single-screw extruder or a twin-screw extruder may be used as the melt kneading machine. The twin-screw extruder is especially preferable as the melt kneading machine. The melt kneading temperature is preferably not lower than the melting point of the thermoplastic resin (a) that is the liquid crystalline polyester and/or the polyphenylene sulfide and not higher than (melting point+ 50° C.).

Any of the following and other methods may be employed as the melt kneading method: (i) method of simultaneously feeding the thermoplastic resin (a) that is the liquid crystalline polyester and/or the polyphenylene sulfide, the metal complex (b) and optionally the filler (c) and other additives from a main feeder and kneading the mixture (batch kneading method); (ii) method of feeding the thermoplastic resin (a) that is the liquid crystalline polyester and/or the polyphenylene sulfide, the metal complex (b) and optionally other additives from a main feeder and kneading the mixture and subsequently optionally adding the filler (c) and other additives from a side feeder and further kneading the mixture (side feed method); and (iii) method of producing a thermoplastic resin composition (master pellets) including high concentrations of the thermoplastic resin (a) that is the liquid crystalline polyester and/or the polyphenylene sulfide, the metal complex (b) and optionally other additives and subsequently kneading the master pellets with the thermoplastic resin (a) that is the liquid crystalline polyester and/or the polyphenylene sulfide and optionally the filler (c) to adjust the concentration to a specified concentration (master pellet method).

The thermoplastic resin composition described above has the excellent laser marking property and the excellent heat resistance and is thus favorable in laser marking applications.

The thermoplastic resin composition can be processed to a molded product having the excellent surface appearance (color tone), mechanical properties and heat resistance by a known melt molding technique such as injection molding, injection compression molding, compression molding, extrusion molding, blow molding, press molding or spinning Examples of the molded product herein include injection molded products, extrusion molded products, press molded products, sheets, pipes, various films such as unstretched films, uniaxially oriented films and biaxially oriented films and various fibers such as undrawn yarns and superdrawn yarns. Injection molding is especially preferable to achieve the significant advantageous effects of the invention.

A molded product made of the thermoplastic resin composition obtained as described above may be employed for: electric and electronic components, such as various gears, various casings, sensors, LED lamps, connectors, sockets, resistors, relays, relay bases, relay spools, switches, coil bobbins, capacitors, variable capacitor cases, optical pickups, oscillators, various terminal strips and boards, transformers, plugs, printed circuit boards, tuners, speakers, microphones, headphones, small motors, magnetic head bases, power modules, housings, semiconductors, liquid crystal display components, FDD carriages, FDD chassis, HDD components, motor brush holders, parabola antennas, thermal protectors and computer components; domestic and office electric appliance components, such as video tape recorder components, TV set components, irons, hair dryers, rice cooker components, microwave oven components, acoustic components, audio equipment components for audios, laserdiscs (registered trademark) and compact disks, lighting components, refrigerator components, air conditioner components, typewriter components and word processor components; optical equipment and precision machine components, such as office computer components, telephone components, facsimile components, copy machine components, cleaning jigs, various bearings including oilless bearings, stern bearings and submerged bearings, motor components, machine components for lighters and typewriters, microscopes, binoculars, cameras and watches; and automobile and vehicle components, such as alternator terminals, alternator connectors, IC regulators, potentiometer bases for light dimmers, various valves including emission valves, various pipes for fuel, exhaust system, and air intake system, air intake nozzle snorkels, intake manifolds, fuel pumps, engine coolant joints, carburetor main bodies, carburetor spacers, emission sensors, coolant sensors, oil temperature sensors, throttle position sensors, crankshaft position sensors, air flowmeters, brake pad wear sensors, thermostat bases for air conditioners, motor insulators for air conditioners, in-vehicle motor insulators for, e.g., power windows, hot air flow control valves, brush holders for radiator motors, water pump impellers, turbine vanes, wiper motor components, distributors, starter switches, starter relays, transmission wire harnesses, windshield washer fluid nozzles, air conditioner panel switch plates, fuel solenoid valve coils, fuse connectors, horn terminals, electric component insulators, step motor rotors, lamp bezels, lamp sockets, lamp reflectors, lamp housings, brake pistons, solenoid bobbins, engine oil filters and ignition cases. The molded product is especially useful for small-size electric and electronic components such as connectors, relays, switches and thermal protectors and automobile components.

The molded product may be a molded product with, for example, characters, symbols, patterns or a barcode marked on the surface of the molded product that is irradiated with laser beam. The molded product described above has the high laser marking property and accordingly enables sharply-defined, clear marking even in the case of fine and precise marking.

The thermoplastic resin composition has a high laser marking property and thus enables marking with even low-power laser beam and reduces adverse effects such as thermal degradation on the surface of a molded product during marking. The thermoplastic resin composition also enables marking with preventing discontinuity and blur of marking even at the high scanning rate and thereby improves the productivity.

The laser used for marking is not specifically limited, but may be any of, for example, $YVO_4$ laser, $CO_2$ laser, Ar laser and excimer laser. Especially preferable are Nd; YAG laser and $YVO_4$ laser working at the fundamental wavelength of 1064 nm or at the second higher wavelength of 532 nm to achieve the higher laser marking property. The oscillation system of the laser beam may be continuous oscillation laser or pulse laser. In terms of ensuring the sharpness of marking and preventing thermal degradation on the surface of a molded product, pulse laser having the high-power laser radiation for a short time is preferable as the laser used for marking.

EXAMPLES

The following further describes our compositions and molded products with reference to examples. The features are, however, not limited to the following examples.

The following describes thermoplastic resins (a) used in respective Examples and Comparative Examples.

Liquid Crystalline Polyester (a-1):

In a 5 L reaction vessel with stirring blades and a distillation pipe, 932 parts by weight of p-hydroxybenzoic acid, 251 parts by weight of 4,4'-dihydroxybiphenyl, 99 parts by weight of hydroquinone, 284 parts by weight of terephthalic acid, 90 parts by weight of isophthalic acid and 1252 parts by weight of acetic anhydride (1.09 equivalents of the total amount of phenolic hydroxyl group) were mixed and were reacted with stirring under nitrogen gas atmosphere at 145° C. for 1 hour. The temperature of this mixture was then raised from 145° C. to 350° C. in 4 hours. After that, the reaction vessel was depressurized to 1.0 mmHg (133 Pa) in 1.0 hour with keeping the polymerization temperature at 350° C., and the reaction further proceeded. The polymerization was completed when the torque required for stirring reached 20 kg·cm. The reaction vessel was then pressurized to 1.0 kg/cm$^2$ (0.1 MPa), and the polymer was formed in strands through nozzles, each having a circular outlet of 10 mm in diameter, and was pelletized with a cutter to the liquid crystalline polyester (a-1).

According to the composition analysis performed for this liquid crystalline polyester (a-1), the ratio of p-hydroxybenzoic acid-derived structural unit (structural unit (I)) was 75 mol % relative to the total of the p-hydroxybenzoic acid-derived structural unit (structural unit (I)), 4,4'-dihydroxybiphenyl-derived structural unit (structural unit (II)) and hydroquinone-derived structural unit (structural unit (III)). The ratio of the 4,4'-dihydroxybiphenyl-derived structural unit (structural unit (II)) was 60 mol % relative to the total of the 4,4'-dihydroxybiphenyl-derived structural unit (structural unit (II)) and the hydroquinone-derived structural unit (structural unit (III)). The ratio of terephthalic acid-derived structural unit (structural unit (IV)) was 76 mol % relative to the total of the terephthalic acid-derived structural unit (structural unit (IV) and isophthalic acid-derived structural unit (structural unit (V)). The total of the 4,4'-dihydroxybiphenyl-derived structural unit (structural unit (II)) and the hydroquinone-derived structural unit (structural unit (III)) was substantially equimolar to the total of the terephthalic acid-derived structural unit (structural unit (IV) and the isophthalic acid-derived structural unit (structural unit (V)). The melting point (Tm) was 330° C., and the melt viscosity was 28 Pa·s.

Liquid Crystalline Polyester (a-2):

In a 5 L reaction vessel with stirring blades and a distillation pipe, 994 parts by weight of p-hydroxybenzoic acid, 126 parts by weight of 4,4'-dihydroxybiphenyl, 112 parts by weight of terephthalic acid, 216 parts by weight of polyethylene terephthalate having the intrinsic viscosity of 0.6 dl/g and 960 parts by weight of acetic anhydride (1.10 equivalents of the total amount of phenolic hydroxyl group) were mixed and were reacted with stirring under nitrogen gas atmosphere at 145° C. for 1 hour. The temperature of this mixture was then raised from 145° C. to 320° C. in 4 hours. After that, the reaction vessel was depressurized to 1.0 mmHg (133 Pa) in 1.0 hour with keeping the polymerization temperature at 320° C., and the reaction further proceeded. The polycondensation was completed when the torque required for stirring reached 20 kg·cm. The reaction vessel was then pressurized to 1.0 kg/cm$^2$ (0.1 MPa), and the polymer was formed in strands through nozzles, each having a circular outlet of 10 mm in diameter, and was pelletized with a cutter.

According to the composition analysis performed for this liquid crystalline polyester (a-2), the structural unit (I) was 66.7 mol %, the structural unit (II) was 6.3 mol %, ethylenedioxy unit derived from polyethylene terephthalate was 10.4 mol %, and the structural unit (IV) was 16.6 mol %. The melting point (Tm) was 313° C., and the melt viscosity was 13 Pa·s. The measurement methods herein were the same as those for (a-1).

Liquid Crystalline Polyester (a-3):

In a 5 L reaction vessel with stirring blades and a distillation pipe, 24.9 parts by weight of p-hydroxybenzoic acid, 812.9 parts by weight of 6-hydroxy-2-naphthoic acid, 419.0 parts by weight of 4,4'-dihydroxybiphenyl, 373.8 parts by weight of terephthalic acid and 964.8 parts by weight of acetic anhydride (1.05 equivalents of the total amount of phenolic hydroxyl group) were mixed and were reacted with stirring under nitrogen gas atmosphere at 145° C. for 1 hour. The temperature of this mixture was then raised from 145° C. to 360° C. in 4 hours. After that, the reaction vessel was depressurized to 1.0 mmHg (133 Pa) in 1.0 hour with keeping the polymerization temperature at 360° C., and the reaction further proceeded. The polycondensation was completed when the torque required for stirring reached 20 kg·cm. The reaction vessel was then pressurized to 1.0 kg/cm$^2$ (0.1 MPa), and the polymer was formed in strands through nozzles, each having a circular outlet of 10 mm in diameter, and was pelletized with a cutter.

According to the composition analysis performed for this liquid crystalline polyester (a-3), the structural unit (I) was 2 mol %, 6-oxy-2-naphthalate unit was 48 mol %, the structural unit (II) was 25 mol % and the structural unit (IV) was 25 mol %. The melting point (Tm) was 350° C., and the melt viscosity was 25 Pa·s. The measurement methods herein were the same as those for (a-1).

Polyphenylene Sulfide (a-4)

PPS resin (M2088) manufactured by Toray Industries, Inc., melting point (Tm)=280° C. (The measurement method of the melting point was the same as that for (a-1)).

The following describes additives (b, z) used in respective Examples and Comparative Examples. The additive (b) is a metal complex according to the embodiment of the invention, and the additive (z) is a metal complex other than that according to the embodiment of the invention or a non-complex.

(b-1) equimolar complex of 2-mercaptobenzimidazole and copper iodide;

(b-2) 2-fold molar complex of 2-mercaptobenzothiazole and zinc ("NOCCELER MZ" manufactured by OUCHI SHINKO CHEMICAL INDUSTRIAL CO., LTD.);

(b-3) bis(8-quinolinolato) copper (II) complex (manufactured by Tokyo Chemical Industry Co., Ltd.);

(b-4) copper (II) acetylacetonate complex (manufactured by KANTO CHEMICAL CO., INC.);

(z-1) phthalocyanine copper (II) complex (manufactured by Tokyo Chemical Industry Co., Ltd.);

(z-2) copper (I) iodide (manufactured by KANTO CHEMICAL CO., INC.);

(z-3) benzimidazole (manufactured by Tokyo Chemical Industry Co., Ltd.); and (z-4) phosphoric anhydride-calcium hydride (manufactured by Taihei Chemical Industrial Co., Ltd).

The following describes fillers (c) used in respective Examples and Comparative Examples:

(c-1) E glass chopped strands (ECS-03T790DE) manufactured by Nippon Electric Glass Co., Ltd.; and (c-2) calcium carbonate (KSS-1000) manufactured by CALFINE CO., LTD.

Examples 1 to 29, Comparative Examples 1 to 11

By using a twin-screw extruder with side feeder TEM 35B manufactured by TOSHIBA MACHINE CO., LTD., the procedure fed the additive (b-1 to b-4, z-1 to z-4) of the mixing amount shown in Tables 1 to 3 from a hopper and fed the filler (c-1, c-2) of the mixing amount shown in Tables 1 to 3 from a side feeder relative to 100 parts by weight of the thermoplastic resin (a-1 to a-4), set the cylinder temperature to the (melting point of the thermoplastic resin+10° C.) and melt-kneaded the mixture to produce pellets. The produced pellets of the thermoplastic resin composition were dried with hot air and were then evaluated with respect to the following properties (1) to (4). The results of evaluation are shown in Tables 1 to 3.

Example 30 and Comparative Example 12

By using a twin-screw extruder with side feeder TEM 35B manufactured by TOSHIBA MACHINE CO., LTD., the procedure fed the additive (b-1, z-2) and EPIKOTE 191P (glycidyl ester epoxy resin) manufactured by Japan Epoxy Resins Co., Ltd. as the compatibilizer of the mixing amounts shown in Tables 2 and 3 from a hopper and fed the filler (c-1) of the mixing amount shown in Tables 2 and 3 from a side feeder relative to the total of 100 parts by weight of two different thermoplastic resins (a-1:a-4=3:7 (weight ratio)), set the cylinder temperature to the (higher melting point of the thermoplastic resins+10° C.) and melt-kneaded the mixture to produce pellets. The produced pellets of the thermoplastic resin composition were dried with hot air and were then evaluated with respect to the following properties (1) to (4). The results of evaluation are shown in Tables 2 and 3.

(1) Evaluation of Laser Marking Property

Each thermoplastic resin composition was molded to a rectangular plate of 50 mm×80 mm×1 mm in thickness by an injection molding machine FANUC α30C (screw diameter: 28 mm, manufactured by FANUC Corporation) under the conditions of the cylinder temperature set to the (melting point of the thermoplastic resin+10° C.) (when two different thermoplastic resins were used in combination, the (higher melting point of the thermoplastic resins+10° C.)) and the mold temperature set to 90° C. for Examples 1 to 21 and Comparative Examples 1 to 10 and to 130° C. for Examples 22 to 30 and Comparative Examples 11 and 12. Characters ("ABCDEFG") having the width of 0.1 mm and the thickness of 0.01 mm were printed on the surface of the molded rectangular plate at the wavelength of 1064 nm, the frequency of 30 Hz and the scanning rate of 700 mm/second with varying laser power by using a $YVO_4$ laser machine MD-V9900A manufactured by KEYENCE Corporation. The printed surface was scanned by a scanner GT-7700U manufactured by SEIKO EPSON Corporation and was subjected to recognition with character recognition software "Yon de!! Koko" (Ver.9.00) manufactured by A.I. Soft, Inc. This test was repeated for 5 samples with respect to each thermoplastic resin composition, and the mean value of the minimum laser power that allowed correct recognition of all the marked characters was determined for evaluation of the laser marking property. The smaller laser power required for recognition of marking was evaluated to have the higher laser marking property.

(2) Evaluation of Thermal Stability in Molten State

Each thermoplastic resin composition was molded at the injection speed of 100 mm/second and the injection pressure of 500 kg/cm² to a rod-like molded product (12.7 mm in width, 0.5 mm in thickness and side gate of 0.5 mm×5.0 mm) by an injection molding machine FANUC α30C (screw diameter: 28 mm, manufactured by FANUC Corporation) under the conditions of the cylinder temperature set to the melting point of the thermoplastic resin+10° C. (when two different thermoplastic resins were used in combination, the higher melting point of the thermoplastic resins+10° C.) and the mold temperature set to 90° C. for Examples 1 to 21 and Comparative Examples 1 to 10 and to 130° C. for Examples 22 to 30 and Comparative Examples 11 and 12. The thermoplastic resin composition was similarly molded after being retained in the cylinder of the molding machine for 30 minutes. This test was repeated for each 100 samples with and without retention with respect to each thermoplastic resin composition, and the flow length of the molded product was measured. The mean value of the flow length of each 100 samples with and without retention was determined, and the rate of change in mean value of the flow length by retention was calculated (absolute value of {mean flow length after retention/mean flow length before retention}−1)×100). The smaller rate of change in flow length of the molded product before and after retention was evaluated to have the better thermal stability in the molten state.

(3) Evaluation of Blister Resistance

Each thermoplastic resin composition was molded to a rod-like molded product (12.7 mm in width, 0.5 mm in thickness and side gate of 0.5 mm×5.0 mm) by an injection molding machine FANUC α30C (screw diameter: 28 mm, manufactured by FANUC Corporation) under the conditions of the cylinder temperature set to the (melting point of the thermoplastic resin+10° C.) (when two different thermoplastic resins were used in combination, the (higher melting point of the thermoplastic resins+10° C.)) and the mold temperature set to 90° C. for Examples 1 to 21 and Comparative Examples 1 to 10 and to 130° C. for Examples 22 to 30 and Comparative Examples 11 and 12. The resulting molded product was subjected to heat treatment at the treatment temperature of 270° C. for 3 minutes by using Perfect Oven (model SPH, manufactured by ESPEC Corporation), and the occurrence or non-occurrence of blister was observed visually. This evaluation test was repeated for 100 samples with respect to each thermoplastic resin composition, and the number of samples with blister out of 100 samples was counted. The less number of samples with blister was evaluated to have the better blister resistance.

(4) Evaluation of Warpage in Reflow

Each thermoplastic resin composition was molded to a 0.3 mm-pitch, 70-core fine pitch connector (0.2 mm in wall thickness and 2-point gate) by an injection molding machine FANUC α30C (screw diameter: 28 mm, manufactured by FANUC Corporation) under the conditions of the cylinder temperature set to the (melting point of the thermoplastic resin+10° C.) (when two different thermoplastic resins were used in combination, the (higher melting point of the thermoplastic resins+10° C.)) and the mold temperature set to 90° C. for Examples 1 to 21 and Comparative Examples 1 to 10 and to 130° C. for Examples 22 to 30 and Comparative Examples 11 and 12. By using a reflow simulator core 9030c (manufactured by CORES Corporation), the molded fine pitch connector was subjected to a reflow process that raised the temperature from room temperature to 200° C. at the temperature increase rate of 1.6° C./second, preheated for 2 minutes, reflowed at the maximum surface temperature of 260° C. for 30 seconds and then cooled down to room temperature. The reflow process was repeated for 5 samples with respect to each thermoplastic resin composition, and the warpage was measured before and after the reflow process. A variation in warpage before and after the reflow process (variation in warpage in the reflow process) was calculated for evaluation by subtracting the warpage before the reflow process from the warpage after the reflow process. The smaller variation in warpage was evaluated to have the better warpage resistance in the reflow process. FIG. 1 is a conceptual diagram illustrating a measurement site of warpage. A longitudinal direction 2 of the fine pitch connector was placed on a horizontal surface plate, and the maximum displacement of the bottom face of the fine pitch connector relative to the horizontal surface plate was measured as a warpage 3 by using a universal projector (V-16A (manufactured by Nikon Corporation)).

TABLE 1

| | t1 | t2 | t3 | t4 | t6 | | | | t11 | | t13 | | |
|---|---|---|---|---|---|---|---|---|---|---|---|---|---|
| | | | | t5 | t8 | t7 | | t10 | t12 | | t14 | t15 | t16 |
| | | | | | | t9 | | | | | | | |
| EX 1 | a-1 | b-1(0.08) | — | 30 | 126 | 130 | 3 | 1 | 0.100 | 0.175 | 0.075 | | |
| EX 2 | a-1 | b-1(0.08) | c-1(54) | 25 | 105 | 108 | 3 | 0 | 0.080 | 0.110 | 0.030 | | |
| EX 3 | a-1 | b-1(0.005) | c-1(54) | 35 | 105 | 107 | 2 | 1 | 0.080 | 0.115 | 0.035 | | |
| EX 4 | a-1 | b-1(9) | c-1(49) | 25 | 107 | 112 | 5 | 3 | 0.090 | 0.130 | 0.040 | | |
| EX 5 | a-1 | b-2(0.008) | c-1(54) | 50 | 106 | 112 | 6 | 2 | 0.085 | 0.130 | 0.045 | | |
| EX 6 | a-1 | b-2(0.005) | c-1(54) | 55 | 105 | 108 | 3 | 2 | 0.085 | 0.125 | 0.040 | | |
| EX 7 | a-1 | b-2(9) | c-1(49) | 45 | 108 | 113 | 5 | 3 | 0.090 | 0.145 | 0.055 | | |
| EX 8 | a-1 | b-3(0.08) | c-1(54) | 55 | 106 | 112 | 6 | 3 | 0.090 | 0.145 | 0.055 | | |
| EX 9 | a-1 | b-3(0.005) | c-1(54) | 55 | 105 | 112 | 7 | 2 | 0.085 | 0.140 | 0.055 | | |
| EX 10 | a-1 | b-3(9) | c-1(49) | 50 | 106 | 114 | 8 | 4 | 0.090 | 0.150 | 0.060 | | |
| EX 11 | a-1 | b-4(0.08) | c-1(54) | 55 | 107 | 115 | 7 | 5 | 0.090 | 0.155 | 0.065 | | |
| EX 12 | a-1 | b-4(0.005) | c-1(54) | 60 | 108 | 116 | 7 | 5 | 0.085 | 0.150 | 0.065 | | |
| EX 13 | a-1 | b-4(9) | c-1(49) | 55 | 108 | 117 | 8 | 6 | 0.085 | 0.160 | 0.075 | | |
| EX 14 | a-2 | b-1(0.08) | c-1(54) | 45 | 115 | 118 | 3 | 4 | 0.090 | 0.175 | 0.085 | | |
| EX 15 | a-2 | b-2(0.08) | c-1(54) | 45 | 116 | 121 | 4 | 4 | 0.085 | 0.175 | 0.090 | | | t1: Thermoplastic Resin: 100 parts by weight
t2: Additive (parts by weight)
t3: Filler (parts by weight) *1
t4: Laser Marking Property
t5: Laser Power (W)
t6: Heat Resistance
t7: Thermal Stability
t8: Flow Length (mm) before Retention
t9: Flow Length (mm) after Retention
t10: Rate of Change in Flow Length (%)
t11: Blister Resistance
t12: Number of Blisters
t13: Warpage in Reflow
t14: Warpage (mm) before Reflow
t15: Warpage (mm) after Reflow
t16: Variation in Warpage (mm) in Reflow
*1 The filler was added relative to the total of 100 parts by weight of the thermoplastic resin and the additive.

TABLE 2

| | t1 | t2 | t3 | t4 | t6 | | | | t11 | | t13 | | |
|---|---|---|---|---|---|---|---|---|---|---|---|---|---|
| | | | | t5 | t8 | t7 t9 | | t10 | t12 | | t14 | t15 | t16 |
| EX 16 | a-2 | b-3(0.08) | c-1(54) | 50 | 116 | 122 | 5 | 5 | 0.100 | 0.200 | 0.100 | | |
| EX 17 | a-2 | b-4(0.08) | c-1(54) | 55 | 115 | 124 | 8 | 6 | 0.095 | 0.215 | 0.120 | | |
| EX 18 | a-3 | b-1(0.08) | c-1(54) | 45 | 96 | 100 | 4 | 4 | 0.085 | 0.160 | 0.075 | | |
| EX 19 | a-3 | b-2(0.08) | c-1(54) | 50 | 95 | 101 | 6 | 5 | 0.085 | 0.170 | 0.085 | | |
| EX 20 | a-3 | b-3(0.08) | c-1(54) | 50 | 95 | 103 | 8 | 6 | 0.085 | 0.190 | 0.105 | | |
| EX 21 | a-3 | b-4(0.08) | c-1(54) | 55 | 96 | 105 | 9 | 8 | 0.090 | 0.200 | 0.110 | | |
| EX 22 | a-4 | b-1(0.08) | — | 65 | 84 | 88 | 5 | 8 | 0.120 | 0.245 | 0.125 | | |
| EX 23 | a-4 | b-1(0.08) | c-1(33) | 65 | 74 | 78 | 5 | 6 | 0.105 | 0.190 | 0.085 | | |
| EX 24 | a-4 | b-1(0.08) | c-1(10) | 65 | 77 | 83 | 8 | 7 | 0.115 | 0.220 | 0.105 | | |
| EX 25 | a-4 | b-1(0.08) | c-1(100)/c-2(86) | 70 | 72 | 76 | 6 | 6 | 0.095 | 0.175 | 0.080 | | |
| EX 26 | a-4 | b-2(0.08) | c-1(33) | 80 | 75 | 82 | 9 | 7 | 0.105 | 0.195 | 0.090 | | |
| EX 27 | a-4 | b-3(0.08) | c-1(33) | 85 | 75 | 83 | 11 | 7 | 0.110 | 0.205 | 0.095 | | |
| EX 28 | a-4 | b-4(0.08) | c-1(33) | 85 | 74 | 83 | 12 | 8 | 0.110 | 0.210 | 0.100 | | |

TABLE 2-continued

|  | t1 | t2 | t3 | t4 t5 | t6 | | | | t11 | | t13 | |
|---|---|---|---|---|---|---|---|---|---|---|---|---|
|  |  |  |  |  | t7 | | | | | | | |
|  |  |  |  |  | t8 | t9 | t10 | t12 | t14 | t15 | t16 | |
| EX 29 | a-4 | b-1(0.08) | c-2(33) | 65 | 73 | 78 | 7 | 7 | 0.120 | 0.235 | 0.115 |
| EX 30 | a-1/a-4 *2 | b-1(0.07) | c-1(43) | 55 | 109 | 113 | 4 | 5 | 0.100 | 0.170 | 0.070 | t1: Thermoplastic Resin: 100 parts by weight
t2: Additive (parts by weight)
t3: Filler (parts by weight) *1
t4: Laser Marking Property
t5: Laser Power (W)
t6: Heat Resistance
t7: Thermal Stability
t8: Flow Length (mm) before Retention
t9: Flow Length (mm) after Retention
t10: Rate of Change in Flow Length (%)
t11: Blister Resistance
t12: Number of Blisters
t13: Warpage in Reflow
t14: Warpage (mm) before Reflow
t15: Warpage (mm) after Reflow
t16: Variation in Warpage (mm) in Reflow
*1 The filler was added relative to the total of 100 parts by weight of the thermoplastic resin and the additive.
*2 The thermoplastic resin of Example 30 was mixture of a-1:a-4 = 3:7.

TABLE 3

|  | t1 | t2 | t3 | t4 t5 | t6 | | | | t11 | | t13 | |
|---|---|---|---|---|---|---|---|---|---|---|---|---|
|  |  |  |  |  | t7 | | | | | | | |
|  |  |  |  |  | t8 | t9 | t10 | t12 | t14 | t15 | t16 | |
| COMP EX 1 | a-1 |  | c-1(54) | 120 | 125 | 115 | 8 | 9 | 0.105 | 0.255 | 0.150 |
| COMP EX 2 | a 1 | b-1(0.0003) | c-1(54) | 120 | 105 | 95 | 10 | 9 | 0.110 | 0.260 | 0.150 |
| COMP EX 3 | a-1 | b-1(15) | c-1(44) | 40 | 105 | 127 | 21 | 15 | 0.105 | 0.265 | 0.160 |
| COMP EX 4 | a-1 | z-1(0.08) | c-1(54) | 50 | 108 | 116 | 7 | 7 | 0.115 | 0.285 | 0.170 |
| COMP EX 5 | a-1 | z-2(0.08) | — | 140 | 106 | 125 | 18 | 14 | 0.125 | 0.300 | 0.175 |
| COMP EX 6 | a-1 | z-2(0.08) | c-1(54) | 115 | 106 | 125 | 18 | 13 | 0.105 | 0.250 | 0.145 |
| COMP EX 7 | a-1 | z-3(0.08) | c-1(54) | 140 | 105 | 126 | 20 | 15 | 0.110 | 0.260 | 0.150 |
| COMP EX 8 | a 1 | z-4(0.08) | c-1(54) | 165 | 106 | 133 | 25 | 23 | 0.110 | 0.275 | 0.165 |
| COMP EX 9 | a-2 | z-2(0.08) | c-1(54) | 125 | 116 | 138 | 19 | 17 | 0.125 | 0.275 | 0.150 |
| COMP EX 10 | a-3 | z-2(0.08) | c-1(54) | 125 | 95 | 118 | 24 | 19 | 0.115 | 0.270 | 0.155 |
| COMP EX 11 | a-4 | z-2(0.08) | c-1(33) | 150 | 74 | 99 | 34 | 24 | 0.120 | 0.275 | 0.155 |
| COMP EX 12 | a-1/a-4 *2 | z-2(0.07) | c-1(43) | 145 | 110 | 131 | 19 | 20 | 0.100 | 0.265 | 0.165 | t1: Thermoplastic Resin: 100 parts by weight
t2: Additive (parts by weight)
t3: Filler (parts by weight) *1
t4: Laser Marking Property
t5: Laser Power (W)
t6: Heat Resistance
t7: Thermal Stability
t8: Flow Length (mm) before Retention
t9: Flow Length (mm) after Retention
t10: Rate of Change in Flow Length (%)
t11: Blister Resistance
t12: Number of Blisters
t13: Warpage in Reflow
t14: Warpage (mm) before Reflow
t15: Warpage (mm) after Reflow
t16: Variation in Warpage (mm) in Reflow
*1 The filler was added relative to the total of 100 parts by weight of the thermoplastic resin and the additive.
*2 The thermoplastic resin of Example 12 was mixture of a-1:a-4 = 3:7.

As shown by the results of Tables 1, 2 and 3, the thermoplastic resin composition enables clear printing even with low laser power and has an excellent laser marking property. The thermoplastic resin composition also has excellent thermal stability in the molten state, excellent blister resistance and excellent warpage resistance. The thermoplastic resin composition is thus suitable for small-size electric and electronic components and molded products in automobile applications that require heat resistance and are subjected to fine laser marking.

INDUSTRIAL APPLICABILITY

The thermoplastic resin composition has a high laser marking property and high heat resistance and is thus useful for small-size electric and electronic components subjected to fine laser marking and automobile components with, for example, characters and symbols printed on the surface of the molded product.

The invention claimed is:

1. A thermoplastic resin composition comprising:
   100 parts by weight of a thermoplastic resin (a) that is a liquid crystalline polyester or a mixture of a liquid crystalline polyester and a polyphenylene sulfide; and
   0.001 to 10 parts by weight of a metal complex (b) having:
   a monodentate or a bidentate ligand;
   wherein said metal complex is selected from the group consisting of an equimolar complex of 2-mercaptobenzimidazole and copper iodide, a 2-fold molar complex of 2-mercaptobenzothiazole and zinc, a bis(8-quinolinolato) copper (II) complex, and a copper (II) acetylacetonate complex,
   the composition having a rate of change in flow length of 2 to 9% in a molding at a temperature of the melting point of the thermoplastic resin (a)+10° C.

2. The thermoplastic resin composition according to claim 1, further comprising 10 to 200 parts by weight of a filler (c) relative to a total of 100 parts by weight of the thermoplastic resin (a) and the metal complex (b).

3. The thermoplastic resin composition according to claim 1, wherein the thermoplastic resin (a) is a liquid crystalline polyester.

4. The thermoplastic resin composition according to claim 1, wherein the thermoplastic resin composition is capable of being laser marked.

5. The thermoplastic resin composition according to claim 1, wherein the thermoplastic resin (a) comprises at least one selected from (i) liquid crystalline polyester having a structural unit derived from p-hydroxybenzoic acid and 6-hydroxy-2-naphthoic acid; (ii) liquid crystalline polyester having a structural unit derived from p-hydroxybenzoic acid, a structural unit derived from 6-hydroxy-2-naphthoic acid, a structural unit derived from an aromatic dihydroxy compound and a structural unit derived from an aromatic dicarboxylic acid; (iii) liquid crystalline polyester having a structural unit derived from p-hydroxybenzoic acid, a structural unit derived from 4,4'-dihydroxybiphenyl and a structural unit derived from an aromatic dicarboxylic acid; (iv) liquid crystalline polyester having a structural unit derived from p-hydroxybenzoic acid, a structural unit derived from 4,4'-dihydroxybiphenyl, a structural unit derived from hydroquinone and a structural unit derived from an aromatic dicarboxylic acid; and (v) liquid crystalline polyester having a structural unit derived from 6-hydroxy-2-naphthoic acid, a structural unit derived from 4,4'-dihydroxybiphenyl and a structural unit derived from 2,6-naphthalenedicarboxylic acid.

6. The thermoplastic resin composition according to claim 1, wherein the thermoplastic resin composition is a liquid crystalline polyester constituted of structural units (I), (II), (III), (IV) and (V)

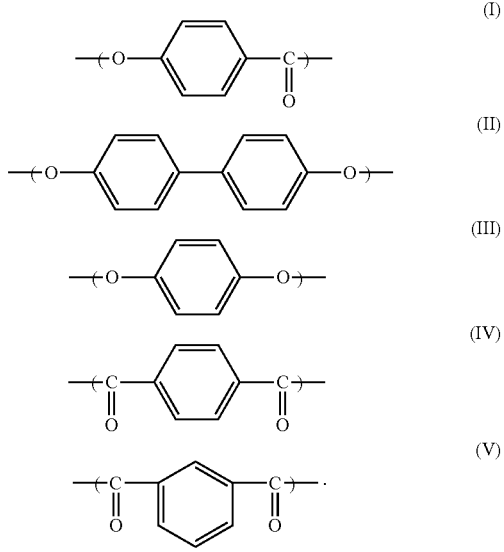

7. The thermoplastic resin composition according to claim 6, wherein a content of the structural unit (I) is not less than 68 mol % and not greater than 80 mol % relative to a total content of the structural units (I), (II) and (III), a content of the structural unit (II) is not less than 55 mol % and not greater than 75 mol % relative to a total content of the structural units (II) and (III), and a content of the structural unit (IV) is not less than 60 mol % and not greater than 85 mol % relative to a total content of the structural units (IV) and (V).

8. A molded product produced by melt molding the thermoplastic resin composition according to claim 1.

9. The molded product according to claim 8, wherein the molded product has been marked by radiation of a laser beam.

10. The molded product according to claim 8, wherein the molded product is a relay, a connector, a switch or a thermal protector.

11. The molded product according to claim 9, wherein the molded product is a relay, a connector, a switch or a thermal protector.

* * * * *